United States Patent
Bear et al.

(10) Patent No.: US 7,116,101 B1
(45) Date of Patent: Oct. 3, 2006

(54) SPECIFIC LOCATION OF HALL CHIPS FOR SENSING REDUNDANT ANGULAR POSITIONS

(75) Inventors: Richard A. Bear, Freeport, IL (US); Michael T. Bunyer, Menomonee Falls, WI (US); Lamar F. Ricks, Freeport, IL (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 11/314,334

(22) Filed: Dec. 20, 2005

(51) Int. Cl.
*G01B 7/34* (2006.01)
*G01B 7/14* (2006.01)

(52) U.S. Cl. .................... 324/251; 324/207.2
(58) Field of Classification Search ............ 324/251, 324/207.2
See application file for complete search history.

(56) References Cited

U.S. PATENT DOCUMENTS

| | | | |
|---|---|---|---|
| 5,159,268 A | 10/1992 | Wu | 324/207.2 |
| 5,341,097 A * | 8/1994 | Wu | 324/207.2 |
| 5,469,054 A | 11/1995 | Bicking | 324/207.2 |
| 5,694,040 A | 12/1997 | Plagens | 324/207.2 |
| 5,698,777 A | 12/1997 | Ramseyer et al. | 73/116 |
| 6,073,713 A | 6/2000 | Brandenburg et al. | 180/65.2 |
| 6,597,205 B1 | 7/2003 | Powell et al. | 327/48 |
| 6,727,689 B1 | 4/2004 | Furlong et al. | 324/207.25 |
| 6,759,843 B1 | 7/2004 | Furlong | 324/207.2 |
| 6,777,926 B1 | 8/2004 | Johnson | 324/174 |
| 2004/0130315 A1 | 7/2004 | Lamb et al. | 324/207.2 |

* cited by examiner

*Primary Examiner*—Reena Aurora
(74) *Attorney, Agent, or Firm*—Kermit D. Lopez; William B. Shelby

(57) ABSTRACT

A Hall-effect sensor apparatus, system and method. In general, a substrate having a surface can be provided. A plurality of Hall-effect sensing elements can then be configured upon the substrate, such that the centerline of a sensing plane associated with the plurality of Hall-effect sensing elements is located towards the surface of substrate, which results in a reduction of the distance between the centerline of the plane of the plurality of Hall-effect sensing elements and an axis of rotation of an associated bias magnet, thereby optimizing the location of the plurality of Hall-effect sensing elements and minimizing sensitivity to misposition and an increase in sensing accuracy.

20 Claims, 2 Drawing Sheets

SPECIFIC LOCATION OF HALL CHIPS FOR SENSING REDUNDANT ANGULAR POSITIONS

TECHNICAL FIELD

Embodiments are generally related to sensor methods and systems. Embodiments are also related to Hall-effect sensors.

BACKGROUND

Various sensors are known in the magnetic effect sensing arts. Examples of common magnetic effect sensors include Hall effect sensors, differential Hall sensors, and magnetoresistive sensor technologies. Such magnetic sensors can respond to the change of magnetic field as influenced by the presence or absence of a ferromagnetic target object of a designed shape passing by the sensory field of the magnetic effect sensor. The sensor can then provide an electrical output signal, which can be further modified as necessary by subsequent electronics to yield appropriate sensing and control information thereof. Associated electronics may be either onboard or outboard of the sensor package.

Geartooth sensors, for example, are known in the automotive arts to provide information to an engine controller for efficient operation of the internal combustion engine. One such known arrangement involves the placing of a ferrous target wheel on the crankshaft of the engine with the sensor located proximate thereto. The target objects, or features, i.e., tooth and slot, are, of course, properly keyed to mechanical operation of engine components. Such sensors can be configured according to the Hall effect, which is well known in the magnetic sensor arts.

The Hall effect has been known for many years. Hall effect sensors are typically based on the utilization of a Hall generator, which generally comprises a magnetic field dependent semiconductor whose function rests on the effect discovered by Edwin Hall. This effect, known as the "Hall effect," is caused by the Lorentz force, which acts on moving charge carriers in a magnetic field.

One of the first practical applications of the Hall effect was as a microwave power sensor in the 1950s. With the later development of the semiconductor industry and its increased ability for mass production, it became feasible to use Hall effect components in high volume products. In 1968, Honeywell International Inc., for example, has produced a number of solid-state sensor devices that take advantage of the Hall effect. The Hall effect sensing element and its associated electronic circuit are often combined in a single integrated circuit.

In its simplest form, a Hall element can be constructed from a thin sheet of conductive material with output connections perpendicular to the direction of electrical current flow. When subjected to a magnetic field, the Hall effect element responds with an output voltage that is proportional to the magnetic field strength. The combination of a Hall effect element in association with its associated signal conditioning and amplifying electronics is sometimes called a Hall effect transducer.

In the differential Hall sensor, two Hall generators may be arranged close to one another. The individual Hall generators operate along the same principle as the magnetic dependent semiconductor in single Hall effect sensors. Both Hall elements are generally biased with a permanent magnet.

Transmission manufacturers generally desire a single sensor to sense the speed and direction of a transmission mechanism. Comparing two output signals and determining which output signal leads or lags the other, with a desired phase between the two signals of approximately 90 degrees, can obtain direction information. Speed information can be obtained by monitoring an associated pulse width or period width of one of the output signals.

In some angle position sensing applications, a Hall-based angle position sensor design can be implemented, utilizing a single Hall effect sensing element to provide one output signal that is proportional to rotation. In such a configuration, the optimum location of the Hall effect sensing element is based on an alignment of the centerline of the sensing plane with the centerline of an associated magnetic bias circuit, which can also be referred to as the "bias magnet." The Hall effect sensing element senses the absolute magnitude of the magnetic field generated by the bias magnet. A low temperature coefficient (TC) material is ordinarily utilized for the bias magnet to minimize the temperature effects of the absolute magnetic field generated by the bias magnet and many readily available Linear Hall effect IC's also provide the provision of compensating for the nominal TC of the bias magnet. In the single Hall element sensing configuration, if the Hall effect sensing element is misaligned from the centerline of the rotational axis of the bias magnet, a significant reduction in sensing accuracy typically results because the Hall effect sensing element no longer senses the "sweet spot" of the bias magnet.

In some applications where the sensors output is related to a safety critical function, it may be necessary to design and incorporate the use of a redundant output. A number of such prior art systems have been implemented, and the two most typical output configurations have one output signal inverted from the other to create an X. Another common configuration involves one output having one half the sensitivity of the other signal. In this regard, additional information can be gained by comparing the two output signals and can indicate system failures or potential wire fault detection methods. When two Hall elements are utilized, however, it is no longer possible to simultaneously align the centerline of the sensing plane of both Hall elements with the centerline of the rotational axis of the bias magnet.

The ideal location of the centerline of the sensing plane of each Hall element is to be as close as possible to the centerline of the rotational axis of the bias magnet. Another method involves minimizing the effects of placement tolerances and misposition, and increasing the size of the bias magnet to increase the area of the "sweet spot" of the bias magnet. Increasing the magnet size, however, increases the cost of the overall magnetic sensing system. It is therefore believed that an improved magnetoresistive sensing system is required to overcome these problems. Such a system and methodology are disclosed in greater detail herein and helps to minimize the distance between the sensing plane of each Hall element to the centerline of the rotational axis of the bias magnet

BRIEF SUMMARY

The following summary is provided to facilitate an understanding of some of the innovative features unique to the embodiments and is not intended to be a full description. A full appreciation of the various aspects of the embodiments disclosed can be gained by taking the entire specification, claims, drawings, and abstract as a whole.

It is, therefore, one aspect of the present invention to provide for an improved sensor apparatus, method and system.

It is another aspect of the present invention to provide for an improved Hall-effect sensing apparatus, method and system.

It is yet a further aspect of the present invention to provide for a Hall-effect based sensing system and sensor packaging design that permits a sensor formed thereof to provide two independent and redundant output signals that possess a minimum sensitivity to mis-position between a bias magnet and one or more associated Hall-effect sensing elements.

It is an additional aspect of the present invention to provide for an improved angular position sensor.

The aforementioned aspects of the invention and other objectives and advantages can now be achieved as described herein. A Hall-effect sensor apparatus, system and method are disclosed. In general, a substrate having a surface can be provided. A plurality of Hall-effect sensing elements can then be configured upon the substrate, such that the centerline of a sensing plane associated with the plurality of Hall-effect sensing elements is located towards the surface of substrate, which results in a reduction of the distance between the centerline(s) of the respective plane(s) of the each Hall-effect sensing element and an axis of rotation of an associated bias magnet, thereby optimizing the location of the plurality of Hall-effect sensing elements and minimizing sensitivity to misposition and an increase in sensing accuracy.

The bias magnet can be located generally proximate to the surface of the substrate, which can be provided as, for example, a Printed Circuit Board (PCB), a plastic lead frame or another type of substrate component, depending upon design considerations. Each sensing element can be implemented as a Hall-effect sensing element. Additionally, the sensing elements can generate at least two independent and redundant output signals that possess a minimum sensitivity to a misposition between the bias magnet and the sensing elements. The bias magnet and the plurality of Hall-effect sensing elements can be adapted for use in sensing an angular position of a target. Additionally, each Hall-effect sensing element among the plurality of Hall-effect sensing elements is preferably arranged in a mirror image configuration with respect to one another.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the principles of the disclosed embodiments.

DETAILED DESCRIPTION

The particular values and configurations discussed in these non-limiting examples can be varied and are cited merely to illustrate at least one embodiment and are not intended to limit the scope of the invention.

Figure 1:
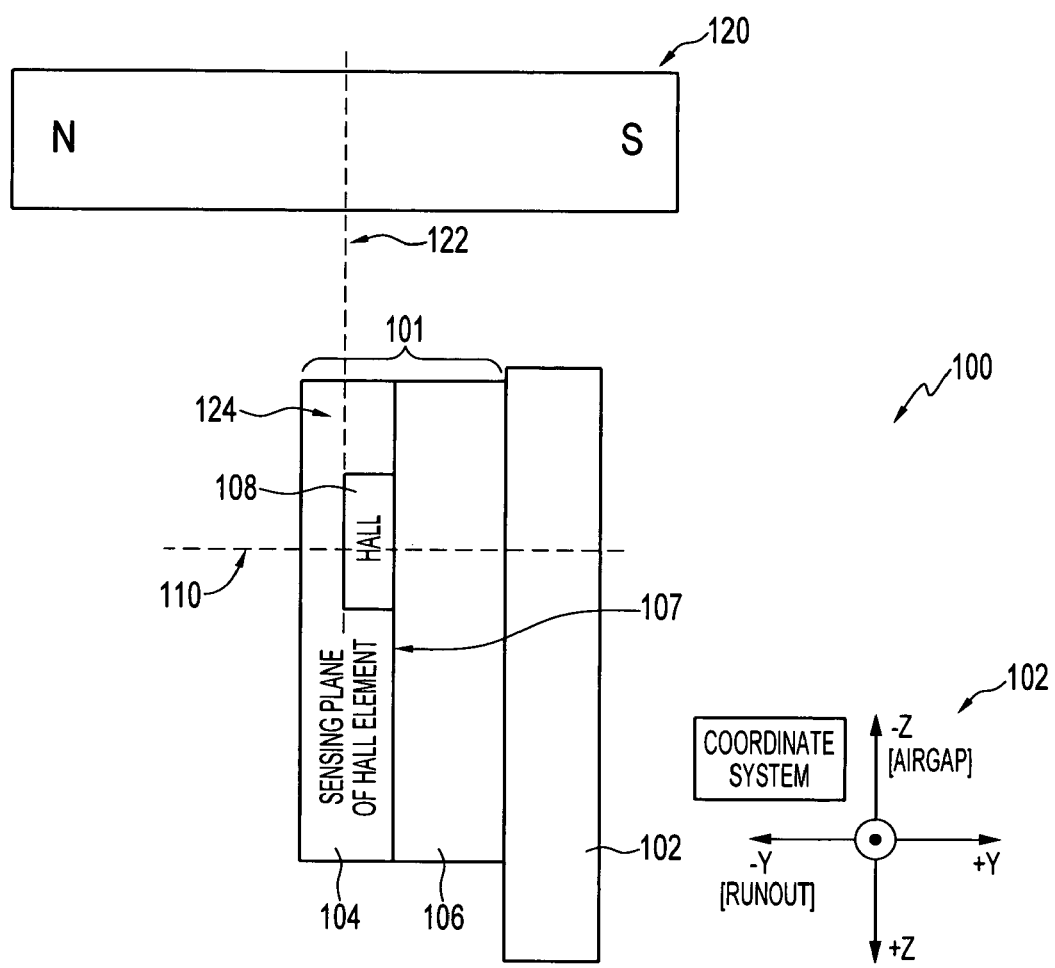
FIG. 1 illustrates a block diagram of a prior art Hall-effect sensing system.

FIG. 1 illustrates a block diagram of a prior art Hall-effect magnetic sensing system 100. In general, the Hall-effect magnetic sensing system 100 can be implemented in the context of a surface mount package 101 that is connected and/or supported by a substrate 102. The Hall effect sensing element 108 is located in the surface mount package of system 100 with its sensing plane located towards the top side of the surface mount component, that is away from the side that would mount towards the substrate 102. A line 107 refers to the leadframe within the surface mount plastic 101. System 100 further includes a bias magnet 120. An axis 122 of rotation of the bias magnet 120 is represented by a dashed line. Similarly, a centerline 124 of the sensing plane of the Hall effect sensing element 108 is also indicated by a dashed line. Note that the dashed line 110 depicted in FIG. 1 can represent the centerline of the surface mount package 101. The configuration in FIG. 1 represents a prior art Hall-effect magnetic circuit for angle position sensing.

A graphical representation of a coordinate system 112 based on x-y-z coordinates is also depicted in FIG. 1. Coordinate system 112 is associated with the configuration of system 100 and referenced herein in order to provide a context for the improvements evidenced by the enhanced Hall-effect sensing system depicted in FIG. 2. FIG. 1 is thus presented for general edification and illustrative purposes only and is not considered a limiting feature of the embodiments disclosed herein.

Figure 2:
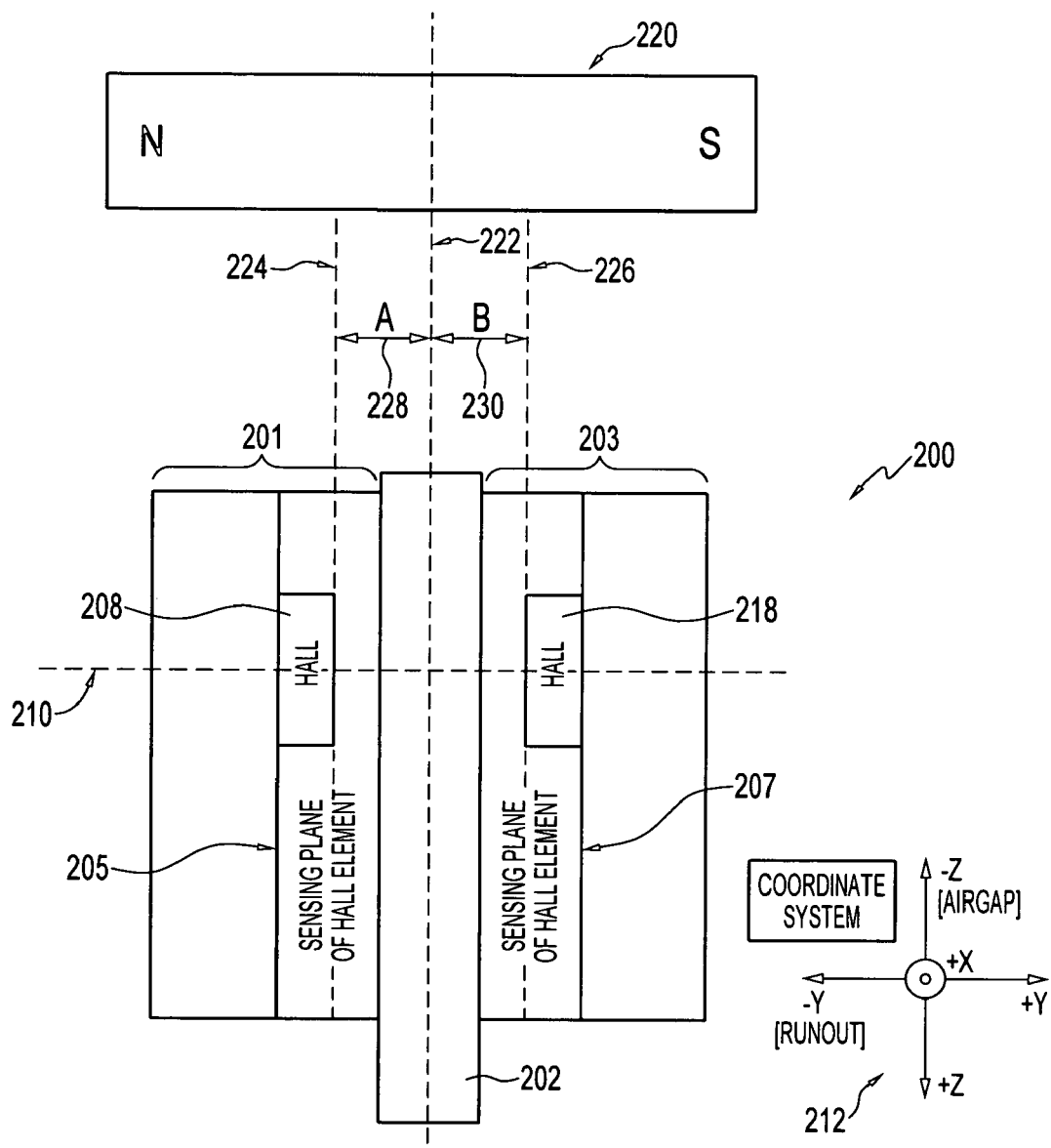
FIG. 2 illustrates a block diagram of a Hall-effect sensing system, which can be implemented in accordance with a preferred embodiment.

FIG. 2 illustrates a block diagram of a Hall-effect magnetic sensing apparatus or system 200, which can be implemented in accordance with a preferred embodiment. Note that in FIG. 2, a graphical representation 212 of the x-y-z coordinates associated with the configuration of apparatus or system 200 is depicted in association with system 200. The Hall-effect magnetic sensing system 200 is generally composed of two surface mount packages 201 and 203. The surface mount package 201 is generally configured to the left of substrate 202, while the surface mount package 203 is configured to the right of substrate 202. A line 205 refers to the leadframe within the surface mount plastic 201. Similarly, a line 207 refers to the leadframe within the surface mount package 203. The dashed line 210 depicted in FIG. 2 can represent the centerline of the surface mount packages 201 and 203.

Note that substrate 202 can be provided, for example, as a Printed Circuit Board (PCB) or another type of electronic substrate, such as, a plastic lead frame. A PCB, for example, can be configured as a generally flat, multi-layer boards made of fiberglass with electrical traces. The surface and sub-layers of the PCB can be configured to use copper traces to provide electrical connections for chips and other components. A plastic lead frame, on the other hand, can be utilized to provide a customized configuration in which a designer can create many packages in order to meet a user's overall need.

A plurality of Hall-effect elements 208 and 218 are also provided as a part of system 200. The Hall-effect element 208 is generally associated with the surface mount plastic package 201, while the Hall-effect sensing element 218 is associated with the surface mount plastic package 203. Note that each Hall effecting sensing element 208 and 218 can be implemented as, for example, a Hall-effect integrated circuit chip or simply a "Hall chip". A bias magnet 220 is also depicted in FIG. 2. An axis 222 of rotation of the bias magnet 220 is illustrated in FIG. 2 as a dashed line. Additionally, respective centerlines 224 and 226 of the sensing planes of the Hall effect elements 208 and 218 are indicated in FIG. 2. A dimension 228 ("A") exists between the axis 222 of rotation of the bias magnet 220 and the centerline 224 of the sensing plane of the Hall Effect element 208. Similarly, a dimension 230 ("B") exists between the axis 222 of rotating of the bias magnet 220 and the centerline 226 of the sensing plane of the Hall effect element 218. Thus, the novelty of the configuration depicted in FIG. 2 is based on reversing the forming of the leads of the surface mount packages 201, 203 depicted in FIG. 2 in order to minimize the respective dimensions 228, 230 of "A" and "B". Optimal performance can be achieved when dimensions 228, 230 are as small as possible and equivalent to one another.

The surface mount packages 201 and 203 are both inverted on the substrate or PCB (Printed Circuit Board) 202, such that the centerlines 224 and 226 of the sensing planes of the Hall-effect elements 208 and 218 are placed towards the surface of substrate or PCB 202. This results in a significant reduction of distance between the centerlines 224 and 226 of the sensing planes of the respective Hall-effect sensing elements 208, 218 and the axis 222 of rotation of the bias magnet 220. Such a configuration therefore places both Hall-effect sensing elements 208, 218 much closer to the "sweet spot" of the bias magnet 220. This results in a sensor system 200 with minimal sensitivity to misposition and increased sensing accuracy.

Apparatus or system 200 can thus be implemented in the context of a configuration in which sensing elements are implemented on or in association with one PCB 202 in such manner as to minimize the distance between the sensing planes of each Hall sensing element 208, 218. The improvements seen in apparatus or system 200 take advantage of the proper location of Hall-effect chips or sensing elements 208, 218 to one another (i.e., mirror images), as well as the location of the sensing elements 208, 218 with respect to the PCB 202 itself (e.g., elements 208, 218 as close to the PCB 202 as possible).

Note that Hall effect technology is generally sensitive to the absolute magnetic field value through the Z-axis of the Hall effect element. Magnetoresistive technology, on the other hand, is sensitive to the absolute magnetic field and the vector of the magnetic field. However, when the magnetic field becomes large enough to "saturate" the magnetoresistive element, it then only becomes sensitive to the angle or vector of the applied magnetic field. It can be appreciated, however, that the embodiment described herein with respect to FIG. 2 applies only to Hall effect technology.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A Hall-effect sensor apparatus, comprising:
a substrate having a surface;
a plurality of surface mount packages inverted on said substrate; and
a plurality of Hall-effect sensing elements configured upon said plurality of surface mount packages, wherein a centerline of a sensing plane associated with said plurality of Hall-effect sensing elements is located toward said surface of substrate, which results in a reduction of a distance between said centerline of said plane of said plurality of Hall-effect sensing elements and an axis of rotation of a bias magnet, thereby optimizing a location of said plurality of Hall-effect sensing elements and minimizing sensitivity to a misposition thereof and an increased sensing accuracy.

2. The apparatus of claim 1 wherein said bias magnet is located proximate to said surface of said substrate.

3. The apparatus of claim 1 wherein said substrate comprises a Printed Circuit Board (PCB).

4. The apparatus of claim 1 wherein said substrate comprises a plastic lead frame.

5. The apparatus of claim 1 wherein each Hall-effect sensing element among said plurality of Hall-effect sensing elements comprises a Hall-effect sensing element.

6. The apparatus of claim 1 wherein said plurality of Hall-effect sensing elements generate at least two independent and redundant output signals that possess a minimum sensitivity to said misposition thereof between said bias magnet and said plurality of Hall-effect sensing elements.

7. The apparatus of claim 1 wherein said bias magnet and said plurality of Hall-effect sensing elements are adapted for use in sensing an angular position of a target.

8. The apparatus of claim 1 wherein each Hall-effect sensing element among said plurality of Hall-effect sensing elements is arranged in a mirror image configuration with respect to one another.

9. A Hall-effect sensor system, comprising:
a Printed Circuit Board (PCB) having a surface;
a bias magnet located proximate to said surface of said PCB;
a plurality of surface mount packages inverted on said PCB;
a plurality of Hall effect sensing elements configured upon said plurality of surface mount packages, wherein a centerline of a sensing plane associated with said plurality of Hall effect sensing elements is located toward said surface of PCB, which results in a reduction of a distance between said centerline of said plane of said plurality of Hall effect sensing elements and an axis of rotation of said bias magnet, thereby optimizing a location of said plurality of Hall effect sensing elements and minimizing sensitivity to a misposition thereof and an increased sensing accuracy.

10. The system of claim 9 wherein said plurality of Hall effect sensing elements generate at least two independent and redundant output signals that possess a minimum sensitivity to said misposition thereof between said bias magnet and said plurality of Hall effect sensing elements.

11. The system of claim 9 wherein said bias magnet and said plurality of Hall effect sensing elements are adapted for use in sensing an angular position of a target.

12. The system of claim 9 wherein each Hall effect sensing element among said plurality of Hall effect sensing elements is arranged in a mirror image configuration with respect to one another.

13. A Hall-effect sensor method, comprising:
providing a substrate having a surface;
providing a plurality of surface mount packages inverted on said substrate; and
configuring a plurality of Hall-effect sensing elements upon said plurality of surface mount packages substrate, wherein a centerline of a sensing plane associated with said plurality of Hall-effect sensing elements is located toward said surface of substrate, which results in a reduction of a distance between said centerline of said plane of said plurality of Hall-effect sensing elements and an axis of rotation of a bias magnet, thereby optimizing a location of said plurality of Hall-effect sensing elements and minimizing sensitivity to a misposition thereof and an increased sensing accuracy.

14. The method of claim 13 wherein said bias magnet is located proximate to said surface of said substrate.

15. The method of claim 13 further comprising providing said substrate as a Printed Circuit Board (PCB).

16. The method of claim 13 further comprising providing said substrate as a plastic lead frame.

17. The method of claim 13 further comprising configuring each Hall-effect sensing element among said plurality of Hall-effect sensing elements to comprise a Hall effect sensing element.

18. The method of claim 13 wherein said plurality of Hall-effect sensing elements generate at least two independent and redundant output signals that possess a minimum sensitivity to said misposition thereof between said bias magnet and said plurality of Hall-effect sensing elements.

19. The method of claim 13 further comprising adapting said bias magnet and said plurality of Hall-effect sensing elements for use in sensing an angular position of a target.

20. The method of claim 13 further comprising arranging each Hall-effect sensing element among said plurality of Hall-effect sensing elements in a mirror image configuration with respect to one another.

* * * * *

UNITED STATES PATENT AND TRADEMARK OFFICE
CERTIFICATE OF CORRECTION

| | | |
|---|---|---|
| PATENT NO. | : 7,116,101 B1 | |
| APPLICATION NO. | : 11/314334 | |
| DATED | : October 3, 2006 | |
| INVENTOR(S) | : Richard A. Bear et al. | |

It is certified that error appears in the above-identified patent and that said Letters Patent is hereby corrected as shown below:

In Column 6, line 55-56, delete "substrate".

Signed and Sealed this

Twenty-seventh Day of March, 2007

JON W. DUDAS
*Director of the United States Patent and Trademark Office*